United States Patent
Takeuchi et al.

(10) Patent No.: US 6,887,929 B2
(45) Date of Patent: May 3, 2005

(54) RESIN COMPOSITION AND GOLF BALL

(75) Inventors: Motokazu Takeuchi, Mie (JP); Masashi Shimakage, Mie (JP); Takashi Toyoizumi, Mie (JP); Iwakazu Hattori, Mie (JP)

(73) Assignee: JSR Corporation, Tokyo (JP)

( * ) Notice: Subject to any disclaimer, the term of this patent is extended or adjusted under 35 U.S.C. 154(b) by 66 days.

(21) Appl. No.: 10/232,610

(22) Filed: Sep. 3, 2002

(65) Prior Publication Data

US 2003/0130425 A1 Jul. 10, 2003

(30) Foreign Application Priority Data

Sep. 4, 2001 (JP) ........................................ 2001-267952
Aug. 5, 2002 (JP) ........................................ 2002-227827

(51) Int. Cl.[7] ........................ A63B 37/12; C08L 33/02; C08L 53/02
(52) U.S. Cl. ........................ 524/426; 524/447; 524/451; 524/505; 525/72; 525/77; 525/89; 525/93; 525/94; 525/209; 525/217; 473/378; 473/385
(58) Field of Search ................................ 524/426, 447, 524/451, 505; 525/72, 77, 89, 93, 94, 209, 217; 473/378, 385

(56) References Cited

U.S. PATENT DOCUMENTS

| | | | |
|---|---|---|---|
| 4,337,947 A | | 7/1982 | Saito et al. |
| 4,994,508 A | * | 2/1991 | Shiraki et al. ............... 524/14 |
| 5,115,035 A | * | 5/1992 | Shiraki et al. ............... 525/314 |
| 5,330,837 A | | 7/1994 | Sullivan |
| 5,504,156 A | | 4/1996 | Takezaki et al. |
| 5,919,862 A | * | 7/1999 | Rajagopalan ............... 525/63 |
| 6,664,334 B1 | * | 12/2003 | Iwami et al. ............... 525/93 |

FOREIGN PATENT DOCUMENTS

| | | |
|---|---|---|
| DE | 195 02 206 | 8/1996 |
| JP | 08-000767 | 1/1996 |
| WO | WO 98/31432 | 7/1998 |

* cited by examiner

*Primary Examiner*—David J. Buttner
(74) *Attorney, Agent, or Firm*—Oblon, Spivak, McClelland, Maier & Neustadt, P.C.

(57) ABSTRACT

An objective of the present invention is to provide a resin composition which gives a molding excellent in flexibility, impact resilience and mechanical properties and a golf ball having the better shot feel, a long carry, and the excellent cutting resistance when used in a golf ball cover. The resin composition of the present invention is characterized in comprising an ionomer resin, an alkoxysilyl group-containing hydrogenated conjugated diene-based polymer and/or an amino group-containing hydrogenated conjugated diene-based polymer. Alkoxysilyl group content and amino group content in the above-mentioned polymers are preferably 0.0001 to 5 mmol/g, respectively. The golf ball of the invention is characterized in that core is covered with a cover material using the above-mentioned resin composition.

28 Claims, No Drawings

RESIN COMPOSITION AND GOLF BALL

FIELD OF THE INVENTION

The present invention relates to a resin composition which gives a molding excellent in flexibility, impact resilience and mechanical properties and also to a golf ball. More particularly, the present invention relates to a resin composition suitable as a cover material for a golf ball and to a golf ball formed of the resin composition.

DESCRIPTION OF THE PRIOR ART

An ionomer resin which is a copolymer of α-olefin and α, β-unsaturated carboxylic acid is utilized in automobile parts, golf balls, ski boots and the like, making use of its excellent toughness, wear resistance, oil resistance and the like. Particularly, by making use of its excellent impact resilience, the ionomer resin is suitably used in manufacturing a golf ball. However, an ionomer resin has a tendency that there is a positive correlation between the impact resilience and the hardness and that the hardness becomes high accordingly when the high impact resilience is sought. For this reason, a golf ball using such an ionomer resin as a cover material shows a sufficient impact resilience but there is a problem that the shot feel is bad. And so, it is desired that a flexibility is given to an ionomer resin without deteriorating the excellent property such as impact resilience.

One of such the formulations, there is known a method of incorporating a thermoplastic elastomer such as a polyester elastomer and a polyamide elastomer into an ionomer resin, whereby, a composition which gives a molding flexible and excellent in impact resilience is obtained (for example, U.S. Pat. No. 4,337,947).

Such thermoplastic elastomers are expensive and, when an amount to be incorporated becomes large, durability of a composition is deteriorated and, therefore, it is required that an amount to be incorporated is made to be as small as possible. That is, in a composition having the same flexibility and impact resilience, a formulation which can reduce an amount of the thermoplastic elastomer to be incorporated is desired. However, when the amount of the ionomer resin component to be incorporated is increased, there is also a problem that impact resilience of a molding made of the composition is reduced, and hardness and rigidity become too high.

In addition, use of an ionomer resin with a thermoplastic elastomer having a crystalline polyethylene block blended therein at a range as a cover material for a golf ball is proposed (JP-A-8-767).

This proposal can be said to be very effective as the technique for remarkably improving hardness of the shot feel and controllability which were problems of a golf ball using the previous ionomer resin as a cover material.

However, the resin composition relating to this proposal is inferior in the compatibility of an ionomer resin with a thermoplastic elastomer having a crystalline polyethylene block and, as a result, there is a case where cutting resistance and the like are problematic. Therefore, there is desired a cover material which solves such the problem and gives a golf ball having a better shot feel and an excellent impact resilience.

SUMMARY OF THE INVENTION

The present invention solves the problems associated with prior arts described above. And an object of the present invention is to provide a resin composition which gives a molding having an excellent flexibility and a mechanical properties and a golf ball having a better shot feel, a long carry, and an excellent cutting resistance when used in a golf ball cover, and to provide a golf ball.

In order to attain the above-mentioned object, the present inventors studied intensively and, as a result, it is found that, by blending an alkoxysilyl group-containing hydrogenated diene-based polymer and/or an amino group-containing hydrogenated diene-based polymer and an ionomer resin, the compatibility between them is better, the flexibility and the mechanical properties of the molding are excellent and, when used in a golf ball cover, the golf ball has a soft and an excellent shot feel and, at the same time, has a high impact resilience and, therefore, the ball initial velocity and the carry are excellent and, moreover, has the better adherability with a golf ball core and, thus, has an excellent cutting resistance in iron shot, which resulted in completion of the present invention.

That is, according to the present invention, there are provided a novel resin composition suitable for a golf ball cover as well as a golf ball made using this resin composition.

The present invention is described as follows.

1. A resin composition comprising (a) an ionomer resin and (b) an alkoxysilyl group-containing hydrogenated conjugated diene-based polymer and/or an amino group-containing hydrogenated conjugated diene-based polymer.

2. The resin composition according to 1 above, wherein alkoxysilyl group content in the above-mentioned alkoxysilyl group-containing hydrogenated conjugated diene-based polymer is 0.0001 to 5 mmol/g and amino group content in the above-mentioned amino group-containing hydrogenated conjugated diene-based polymer is 0.0001 to 5 mmol/g.

3. The resin composition according to 2 above, wherein the above-mentioned alkoxysilyl group-containing hydrogenated conjugated diene-based polymer and the above-mentioned amino group-containing hydrogenated conjugated diene-based polymer are polymers which are saturated at 80% or more of double bonds derived from conjugated diene.

4. The resin composition according to 3 above, further containing at least one inorganic filler selected from the group consisting of titanium oxide, talc, calcium carbonate and kaolin.

5. The resin composition according to 2 above, wherein the above-mentioned alkoxysilyl group-containing hydrogenated conjugated diene-based polymer is a polymer prepared by polymerizing a conjugated diene or a conjugated diene and an aromatic vinyl compound in the presence of an organic alkali metal compound, reacting the resulting conjugated diene-based polymer with an alkoxysilane compound and, thereafter, hydrogenating the modified polymer.

6. The resin composition according to 5 above, wherein the above-mentioned conjugated diene-based polymer is a block copolymer containing 2 or more polymer blocks selected from the group consisting of polymer blocks (A) to (D).

(A) an aromatic vinyl compound polymer block whose content of an aromatic vinyl compound is 80 wt % or more, (B) a conjugated diene polymer block whose content of a vinyl bond is less than 25 wt %, (C) a conjugated diene polymer block whose content of a vinyl bond is 25 to 90 wt %, and (D) a random copolymer block of an aromatic vinyl compound and a conjugated diene.

7. The resin composition according to 6 above, wherein the above-mentioned alkoxysilyl group-containing hydrogenated conjugated diene-based polymer and the above-mentioned amino group-containing hydrogenated conjugated diene-based polymer are polymers which are saturated at 80% or more of double bonds derived from conjugated diene.

8. The resin composition according to 7 above, further containing at least one inorganic filler selected from the group consisting of titanium oxide, talc, calcium carbonate and kaolin.

9. The resin composition according to 2 above, wherein the above-mentioned amino group-containing hydrogenated conjugated diene-based polymer is at least one polymer selected from the group consisting of (i) to (iii) below.

(i) Polymer prepared by polymerizing a conjugated diene or a conjugated diene and an aromatic vinyl conpound in the presence of an organic alkali metal compound having amino group, and hydrogenating the resulting conjugated diene-based polymer.

(ii) Polymer prepared by polymerizing a conjugated diene and a unsaturated monomer having amino group, or these compounds and an aromatic vinyl conpound in the presence of an organic alkali metal compound, and hydrogenating the resulting conjugated diene-based polymer.

(iii) Polymer prepared by polymerizing a conjugated diene or a conjugated diene and an aromatic vinyl conpound in the presence of an organic alkali metal compound, reacting the resulting conjugated diene-based polymer and a compound represented by the general formula (1) to a modified polymer, and hydrogenating the resulting modified polymer.

$$R^1R^2C=N-Y \qquad (1)$$

[In the general formula (1), $R^1$ and $R^2$ are respectively a hydrogen atom, an alkyl group having a carbon number of 1 to 20, an aryl group having a carbon number of 6 to 20, an aralkyl group having a carbon number of 7 to 20 or an organosiloxyl group having a carbon number of 1 to 100. And Y is a hydrogen atom, a trialkylsilyl group having a carbon number of 3 to 18, an alkyl group having a carbon number of 1 to 20, an aryl group having a carbon number of 6 to 20, an aralkyl group having a carbon number or 7 to 20 or an organosiloxyl group having a carbon number of 1 to 100.]

10. The resin composition according to 9 above, wherein the above-mentioned conjugated diene-based polymer is a block copolymer containing 2 or more polymer blocks selected from the group consisting of polymer blocks (A) to (D).

(A) an aromatic vinyl compound polymer block whose content of an aromatic vinyl compound is 80 wt % or more, (B) a conjugated diene polymer block whose content of a vinyl bond is less than 25 wt %, (C) a conjugated diene polymer block whose content of a vinyl bond is 25 to 90 wt %, and (D) a random copolymer block of an aromatic vinyl compound and a conjugated diene.

11. The resin composition according to 10 above, wherein the above-mentioned alkoxysilyl group-containing hydrogenated conjugated diene-based polymer and the above-mentioned amino group-containing hydrogenated conjugated diene-based polymer are polymers which are saturated at 80% or more of double bonds derived from conjugated diene.

12. The resin composition according to 11 above, further containing at least one inorganic filler selected from the group consisting of titanium oxide, talc, calcium carbonate and kaolin.

13. The resin composition according to 1 above, which is used for a golf ball cover.

14. A golf ball whose core is covered with a cover material consisting of the resin composition comprising (a) an ionomer resin and (b) an alkoxysilyl group-containing hydrogenated conjugated diene-based polymer and/or an amino group-containing hydrogenated conjugated diene-based polymer.

15. The golf ball according to 14 above, wherein alkoxysilyl group content in the above-mentioned alkoxysilyl group-containing hydrogenated conjugated diene-based polymer is 0.0001 to 5 mmol/g and amino group content in the above-mentioned amino group-containing hydrogenated conjugated diene-based polymer is 0.0001 to 5 mmol/g.

16. The golf ball according to 15 above, wherein the above-mentioned alkoxysilyl group-containing hydrogenated conjugated diene-based polymer is a polymer prepared by polymerizing a conjugated diene or a conjugated diene and an aromatic vinyl compound in the presence of an organic alkali metal compound, reacting the resulting conjugated diene-based polymer with an alkoxysilane compound and, thereafter, hydrogenating the modified polymer.

17. The golf ball according to 16 above, further containing at least one inorganic filler selected from the group consisting of titanium oxide, talc, calcium carbonate and kaolin in the above-mentioned resin composition.

18. The golf ball according to 15 above, wherein the above-mentioned amino group-containing hydrogenated conjugated diene-based polymer is at least one polymer selected from the group consisting of (i) to (iii) below.

(i) Polymer prepared by polymerizing a conjugated diene or a conjugated diene and an aromatic vinyl conpound in the presence of an organic alkali metal compound having amino group, and hydrogenating the resulting conjugated diene-based polymer.

(ii) Polymer prepared by polymerizing a conjugated diene and a unsaturated monomer having amino group, or these compounds and an aromatic vinyl conpound in the presence of an organic alkali metal compound, and hydrogenating the resulting conjugated diene-based polymer.

(iii) Polymer prepared by polymerizing a conjugated diene or a conjugated diene and an aromatic vinyl conpound in the presence of an organic alkali metal compound, reacting the resulting conjugated diene-based polymer and a compound represented by the general formula (1) to a modified polymer, and hydrogenating the resulting modified polymer.

$$R^1R^2C=N-Y \qquad (1)$$

[In the general formula (1), $R^1$ and $R^2$ are respectively a hydrogen atom, an alkyl group having a carbon number of 1 to 20, an aryl group having a carbon number of 6 to 20, an aralkyl group having a carbon number of 7 to 20 or an organosiloxyl group having a carbon number of 1 to 100. And Y is a hydrogen atom, a trialkylsilyl group having a carbon number of 3 to 18, an alkyl group having a carbon number of 1 to 20, an aryl group having a carbon number of 6 to 20, an aralkyl group having a carbon number or 7 to 20 or an organosiloxyl group having a carbon number of 1 to 100.]

19. The golf ball according to 18 above, further containing at least one inorganic filler selected from the group consisting of titanium oxide, talc, calcium carbonate and kaolin in the above-mentioned resin composition.

According to the present invention, by comprising an ionomer resin and an alkoxysilyl group-containing hydrogenated conjugated diene-based polymer and/or an amino group-containing hydrogenated conjugated diene-based polymer, a molding excellent in flexibility, impact resilience, and mechanical properties can be obtained. In addition, it is very useful in a cover material for a golf ball with such characterization. Further, a golf ball produced by covering with this cover material leads to a better shot feel, a long carry and an excellent cutting resistance.

DETAILED DESCRIPTION OF THE INVENTION

Hereinafter, embodiments of the resin composition of the present invention will be explained specifically.

The resin composition of the present invention is comprising of (a) an ionomer resin and (b) an alkoxysilyl group-containing hydrogenated conjugated diene-based polymer and/or an amino group-containing hydrogenated conjugated diene-based polymer.

Each component will be explained more specifically below.

1. Ionomer Resin

As the ionomer resin (hereinafter, referred to as "component (a)" in some cases) used in the present invention, any ionomer resins which have conventionally been used as for a cover material for a golf ball can be used, and a resin can be suitably used in which a carboxyl group of a copolymer of α-olefin and α, β-unsaturated carboxylic acid or a copolymer of α-olefin, α, β-unsaturated carboxylic acid and an ester thereof is neutralized with a metal ion (Na, Li, Zn, Mg, K and the like).

Examples of the α-olefin include ethylene, propylene and the like which have a small number of carbons.

Examples of the α, β-unsaturated carboxylic acid include acrylic acid, methacrylic acid, maleic acid, fumaric acid and the like. Among them, acrylic acid and methacrylic acid are preferable in particular. Examples of the ester thereof include esters obtained by reacting the above-mentioned carboxylic acid with a lower alcohol such as methanol, ethanol, propanol, n-butanol, iso-butanol and, acrylic ester and methacrylic ester are preferable in particular.

In addition, in the case of a binary copolymer of α-olefin and α, β-unsaturated carboxylic acid, a copolymer having α, β-unsaturated carboxylic acid at a content of 5 to 20 wt % is preferable and, in the case of a tercopolymer of α-olefin, α, β-unsaturated carboxylic acid and an ester thereof, it is preferable that α, β-unsaturated carboxylic acid content is 1 to 10 wt % and an ester component content 12 to 45 wt %. Further, it is preferable that a degree of neutralization with the above-mentioned metal ion is 10 to 90% by mole of an acid group.

As such the ionomer resin, commercially available products such as "Surlyn" manufactured by DuPont, and "HIMILAN" manufactured by DuPont-Mitsui Polychemicals Co. Ltd., can be used.

From the viewpoint of an improvement in impact resilience, it is preferable that an ionomer having a monovalent metal and an ionomer having a divalent metal are used by mixing. For example, mixing the former and the latter at a weight ratio of 20/80 to 80/20 is preferred.

2. Alkoxysilyl Group-containing Hydrogenated Conjugated Diene-based Polymer and Amino Group-containing Hydrogenated Conjugated Diene-based Polymer Among the alkoxysilyl group-containing hydrogenated conjugated diene-based polymer and the amino group-containing hydrogenated conjugated diene-based polymer (hereinafter, referred to as "component (b)" in some cases) according to the present invention, the alkoxysilyl group-containing hydrogenated conjugated diene-based polymer is not particularly limited and can be easily obtained by polymerizing a conjugated diene or a conjugated diene and an aromatic vinyl compound using an organic alkali metal compound as a polymerization initiator in an inert organic solvent, reacting an alkoxysilane compound to the resulting conjugated diene-based polymer to generate a modified polymer, hydrogenating the modified polymer.

The above-mentioned "alkoxysilyl group" is a group which an alkoxyl selected from the group consisting of an alkyloxy having a carbon number of 1 to 20, an aryloxy having a carbon number of 6 to 20, and an aralkyloxy having a carbon number of 7 to 20 is bound to a silicon atom and may be used a alkoxysilyl group which alkoxy such as methoxy, ethoxy, butoxy, propoxy, pentyloxy, neopentyloxy, hexyloxy, amyloxy and phenoxy, particularly methoxy, ethoxy, amyloxy and phenoxy, is bound to a silicon atom.

Examples of the above-mentioned "conjugated diene" include 1,3-butadiene, isoprene, 2,3-dimethyl-1,3-butadiene, 1,3-pentadiene, 2-methyl-1,3-octadiene, 1,3-hexadiene, 1,3-cyclohexadiene, 4,5-diethyl-1,3-octadiene, 3-butyl-1,3-octadiene, myrcene, chloroprene and the like. Among these, 1,3-butadiene and isoprene are preferable.

In addition, as a monomer to be polymerized, the above-mentioned "conjugated diene" may be used alone, but the conjugated diene may be polymerized with other compound. For example, the above-mentioned "conjugated diene" and "an aromatic vinyl compound" may be copolymerized. Examples of the above-mentioned "aromatic vinyl compound" include styrene, tert-butylstyrene, α-methylstyrene, p-methylstyrene, p-ethylstyrene, divinylbenzene, 1,1-diphenylstyrene, vinylnaphthalene, vinylanthracene, N,N-diethyl-p-aminoethylstyrene, vinylpyridine and the like. Among these, styrene and tert-butylstyrene are preferable. In this case, the above-mentioned "conjugated diene" and the above-mentioned "aromatic vinyl compound" may be copolymerized together with other compound.

Examples of the above-mentioned "organic alkali metal compound" which is a polymerization initiator include an organic lithium compound, an organic sodium compound and the like. In particular, an organic lithium compound is preferable. As the organic lithium compound, for example, an organic monolithium compound, an organic dilithium compound and an organic polylithium compound are used.

Examples of the organic lithium compound include ethyllithium, n-propyllithium, iso-propyllithium, n-butyllithium, sec-butyllithium, tert-butyllithium, pentyllithium, hexyllithium, cyclohexyllithium, phenyllithium, hexamethylenedilithium, cyclopentadienyllithium, indenyllithium, 1,1-diphenyl-n-hexyllithium, 1,1-diphenyl-3-methylpentyllithium, lithiumnaphthalene, butadienyldilithium, isopropenyldilithium, m-diisopropenyldilithium, 1,3-phenylene-bis-(3-methyl-1-phenylpentylidene)bislithium, 1,3-phenylene-bis-(3-methyl-1,[4-methylphenyl] pentylidene)bislithium, 1,3-phenylene-bis-(3-methyl-1,[4-dodecylphenyl]pentylidene)bislithium, 1,1,4,4-tetraphenyl-1,4-dilithiobutane, polybutadienyllithium, polyisoprenyllithium, polystyrene-butadienyllithium, polystyrenyllithium, polyethylenyllithium, poly-1,3-cyclohexadienyllithium, polystyrene-1,3-cyclohexadienyllithium, polybutadiene-1,3-cyclohexadienyllithium and the like.

Among these, ethyllithium, n-propyllithium, iso-propyllithium, n-butyllithium, sec-butyllithium, tert-butyllithium, cyclohexyllithium, butadienyllithium, isopropenyldilithium, 1,3-phenylene-bis-(3-methyl-1-phenylpentylidene)bislithium, 1,3-phenylene-bis-(3- methyl-1,[4-methylphenyl]pentylidene)bislithium, 1,3-phenylene-bis-(3-methyl-1,[4-dodecylphenyl]pentylidene) bislithium, 1,1,4,4-tetraphenyl-1,4-dilithiobutane, polybutadienyllithium, polyisoprenyllithium, polystyrene-butadienyllithium, polystyrenyllithium. poly-1,3-cyclohexadienyllithium, polystyrene-1,3-cyclohexadienyllithium, polybutadiene-1,3-cyclohexadienyllithium and the like are preferred. Examples of the more preferable organic lithium compound include n-butyllithium, sec-butyllithium, tert-butyllithium, 1,3-phenylene-bis-(3-methyl-1-phenylpentylidene)bislithium and the like. These may be used alone or in combination of two or more.

An amount of an organic alkali metal compound to be used is not particularly limited. If needed, various amounts may be used. The amount is usually 0.02 to 15 wt %, preferably 0.03 to 5 wt % based on 100 wt % of the monomer.

The structure of the alkoxysilane compound is not limited as long as it can be reacted with the conjugated diene-based polymer to obtain a modified polymer. It is preferable that the alkoxysilane compound is at least one selected from the group consisting of alkoxysilane compounds represented by the general formula (2).

$R^3{}_{(4-m-n)}Si(OR^4)_m X^1{}_n$            (2)

[In the general formula (2), $R^3$ is an alkyl group having a carbon number of 1 to 20, an aryl group having a carbon number of 6 to 20, an aralkyl group having a carbon number of 7 to 20 or an organosiloxyl group having a carbon number of 1 to 100. And, when there are a plurality of $R^3$s, respective $R^3$ may be the same or different. And $R^4$ is an alkyl group having a carbon number of 1 to 20, an aryl group having a carbon number of 6 to 20 or an aralkyl group having a carbon number of 7 to 20, and when there are a plurality of $R^4$s, respective $R^4$ may be the same or different. $X^1$ is a substituent (provided that $OR^4$ is excluded) having a polar group containing at least one selected from the group consisting of an O atom and a Si atom, and when there are a plurality of $X^1$s, respective $X^1$ may be the same or different, or respective $X^1$ may be an independent substituent or form a cyclic structure. m is 1, 2 or 3, and n is 0, 1, 2 or 3. The sum of m and n is 1 to 4. It is preferable that m is 2 or 3, and n is 0 or 1.]

The alkoxysilane compounds represented by the general formula (2) include tetraethoxysilane, tetramethoxysilane, methyltriethoxysilane, methyltrimethoxysilane, dimethyldimethoxysilane, dimethyldiethoxysilane, methyltriphenoxysilane, dimethyldiphenoxysilane, 1-trimethylsilyl-2-dimethoxy-1-aza-2-silacyclopentane, 1-trimethylsilyl-2-diethoxy-1-aza-2-silacyclopentane, γ-glycidoxypropyldimethoxysilane, γ-glycidoxypropyldiethoxysilane, γ-glycidoxypropyltriethoxysilane, γ-methacryloxypropyldimethoxysilane, γ-methacryloxypropyltrimethoxysilane, trimethylsiloxytriphenoxysilane, trimethylsiloxytrimethoxysilane, trimethylsiloxytriethoxysilane, trimethylsiloxytributoxysilane and 1,1,3,3-tetramethyl-1-phenoxydisiloxane.

It is preferable that modification reaction is performed by adding the above-mentioned alkoxysilane compound into a polymerization system at a timepoint where a polymerization conversion in preparing a conjugated diene-based polymer becomes 90 to 100%. Alternatively, adding the alkoxysilane compound may be before a polymerization conversion reaches 90%. And the alkoxysilane compound may be added intermittently or continuously during polymerization.

An amount of the above-mentioned alkoxysilane compound to be added is preferably 0.05 to 5-fold mole, more preferably 0.1 to 1.5-fold mole relative to mole of active points derived from an organic alkali metal compound.

Alkoxysilyl group content in the resulting modified conjugated diene-based polymer obtained by reacting a conjugated diene-based polymer and an alkoxysilane compound is usually 0.0001 to 5 mmol/g, preferably 0.001 to 1 mmol/g, more preferably 0.003 to 0.1 mmol/g. Although an alkoxysilyl group is usually present at an end of a polymer chain, it may be present on a side chain. The alkoxysilyl group content is not changed by hydrogenation described below.

The alokoxysilyl group-containing hydrogenating conjugated diene-based polymer is selectively obtained by hydrogenation of the above-mentioned modified polymer. A method of hydrogenation and the reaction conditions are not particularly limited. Hydrogenation is usually carried out in the range of 20 to 150° C. under the hydrogen pressure in the range of 0.1 to 10 MPa in the presence of a hydrogenating catalyst. In this case, a hydrogenation rate can be arbitrarily selected by varying an amount of a hydrogenating catalyst, a hydrogen pressure at a hydrogenating reaction or a reaction time. A hydrogenation rate is 80% or more, particularly preferably 95% or more based on a double bond derived from a conjugated diene which is an unsaturated part.

As the hydrogenating catalyst, compounds containing any of elements of Periodic Table Groups Ib, IVb, Vb, VIb, VIIb and VIII, for example, compounds containing Ti, V, Co, Ni, Zr, Ru, Rh, Pd, Hf, Re and Pt elements can be usually used. Examples of the hydrogenating catalyst include metallocene series compounds containing Ti, Zr, Hf, Co, Ni, Pd, Pt, Ru, Rh, Re and the like, carrying type heterogeneous catalysts in which metal such as Pd, Ni, Pt, Rh and Ru are carried in carrier such as carbon, silica, alumina and diatomaceous earth, homogeneous Tiegler type catalyst which are a combination of an organic salt or an acetylacetone salt of Ni, Co and the like and a reducing agent such as organic aluminum and the like, organic metal compounds or complexes of Ru, Rh and the like, and fullerene and carbon nanotube in which hydrogen is occluded.

Among these, metallocene compounds containing any one of Ti, Zr, Hf, Co and Ni are preferable in that a hydrogenating reaction can be performed in an inert organic solvent in the homogeneous system. Metallocene compounds containing any one of Ti, Zr and Hf are more preferable. In particular, hydrogenating catalysts obtained by reacting a titanocene compound and alkyllithium are preferable since they are inexpensive and industrially particularly useful. Examples thereof are hydrogenating catalysts described in JP-A-1-275605, JP-A-5-271326, JP-A-5-271325, JP-A-5-222115, JP-A-11-292924, JP-A-2000-37632, JP-A-59-133203, JP-A-63-5401, JP-A-62-218403, JP-A-7-90017, JP-B-43-19960, and JP-B-47-40473. The hydrogenating catalyst may be used alone or in combination of two or more.

In the present invention, using an alkoxysilane compound having a substituent to be a protecting group can lead to a modified polymer having a protecting group. Therefore, if a protecting group is bound to the modified polymer, the protecting group may be removed during the hydrogenation and/or after the hydrogenation. The way how to remove the protecting group is not particularly limited and it can be selected depending upon a kind of the protecting group. The way how to remove the protecting the protecting group after hydrogenation is not particularly limited and it is performed by hydrolysis and the like.

Molecular weight of the alkoxysilyl group-containing hydrogenated conjugated diene-based polymer according to the present invention is not particularly limited, but is generally 30,000 to 2,000,000, preferably 40,000 to 1,000,000, more preferably 50,000 to 500,000 as expressed by weight-average molecular weight.

The alkoxysilyl group-containing hydrogenated conjugated diene-based polymer according to the present invention may have another functional group such as amino group, epoxy group, glycidyl group, methacryloyl group and acryloyl group.

On the other hand, the amino group-containing hydrogenated conjugated diene-based polymer in component (b) is not particularly limited and may be used polymers (i) to (iii) exemplified below.

(i) Polymer prepared by polymerizing a conjugated diene or a conjugated diene and an aromatic vinyl compound in the presence of an organic alkali metal compound having amino group, and hydrogenating the resulting conjugated diene-based polymer.

(ii) Polymer prepared by polymerizing a conjugated diene and a unsaturated monomer having amino group, or these compounds and an aromatic vinyl compound in the presence of an organic alkali metal compound, and hydrogenating the resulting conjugated diene-based polymer.

(iii) Polymer prepared by polymerizing a conjugated diene or a conjugated diene and an aromatic vinyl compound in the presence of an organic alkali metal compound, reacting the resulting conjugated diene-based polymer and a compound represented by the general formula (1) to a modified polymer, and hydrogenating the resulting modified polymer.

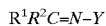  (1)

[In the general formula (1), $R^1$ and $R^2$ are respectively a hydrogen atom, an alkyl group having a carbon number of 1 to 20, an aryl group having a carbon number of 6 to 20, an aralkyl group having a carbon number of 7 to 20 or an organosiloxyl group having a carbon number of 1 to 100. And Y is a hydrogen atom, a trialkylsilyl group having a carbon number of 3 to 18, an alkyl group having a carbon number of 1 to 20, an aryl group having a carbon number of 6 to 20, an aralkyl group having a carbon number or 7 to 20 or an organosiloxyl group having a carbon number of 1 to 100.]

The organic alkali metal compound having amino group used for the production of the above-mentioned polymer (i) may be used compounds represented by the general formulas (3) and (4) below.

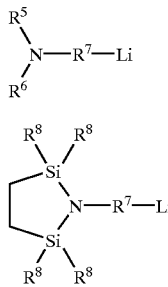

[In the general formula (3), both $R^5$ and $R^6$ are a trialkylsilyl group having a carbon number of 3 to 18, or one of them is the trialkylsilyl group and the other is an alkyl group having a carbon number of 1 to 20, an aryl group having a carbon number of 6 to 20, an aralkyl group having a carbon number of 7 to 20 or an organosiloxyl group having a carbon number of 1 to 100. And, $R^7$ in the general formulas (3) and (4) is an alkylene group having a carbon number of 1 to 20 or an alkylidene group having a carbon number of 1 to 20. Further, $R^8$ in the general formula (4) is an alkyl group having a carbon number of 1 to 20, an aryl group having a carbon number of 6 to 20, an aralkyl group having a carbon number of 7 to 20 or an organosiloxyl group having a carbon number of 1 to 100.]

The organic alkali metal compound represented by the general formulas (3) and (4) include 3-lithio-1-[N,N-bis(trimethylsilyl)]aminopropane (CAS No.289719-98-8), 2-lithio-1-[N,N-bis(trimethylsilyl)]aminoethane, 3-lithio-2,2-dimethyl-1-[N,N-bis(trimethylsilyl)]aminopropane, 2,2,5,5-tetramethyl-1-(3-lithiopropyl)-1-aza-2,5-disilacyclopentane, 2,2,5,5-tetramethyl-1-(3-lithio-2,2-dimethylpropyl)-1-aza-2,5-disilacyclopentane, 2,2,5,5-tetramethyl-1-(2-lithioethyl)-1-aza-2,5-disilacyclopentane, 3-lithio-1-[N-(tert-butyl-dimethylsilyl)-N-trimethylsilyl] aminopropane, 3-lithio-1-(N-methyl-N-trimethylsilyl) aminopropane, 3-lithio-1-(N-ethyl-N-trimethylsilyl) aminopropane and the like.

A method of hydrogenation and the reaction conditions for the polymer (i) are not particularly limited and are the same as for the alkoxysilyl group-containing hydrogenated conjugated diene-based polymer. A hydrogenation rate is 80% or more, particularly preferably 95% or more based on a double bond derived from a conjugated diene which is an unsaturated part.

The unsaturated monomer having amino group for the production of the above-mentioned polymer (ii) may be used compounds represented by the general formulas (5) and (6) below.

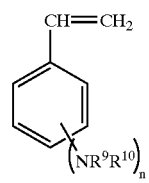  (5)

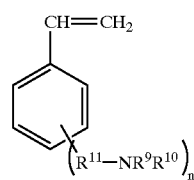  (6)

[In the general formulas (5) and (6), both $R^9$ and $R^{10}$ are a trialkylsilyl group having a carbon number of 3 to 18, or one of them is the trialkylsilyl group and the other is an alkyl group having a carbon number of 1 to 20, an aryl group having a carbon number of 6 to 20, aralkyl group having a carbon number of 7 to 20 or an organosiloxyl group having a carbon number of 1 to 100. And $R^{11}$ in the general formula (6) is an alkylene group having a carbon number of 1 to 20 or an alkylidene group having a carbon number of 1 to 20. Further, n in the general formulas (5) and (6) is 1 to 3.]

The unsaturated monomer represented by the general formulas (5) and (6) includes p-[N,N-bis(trimethylsilyl)amino]styrene, p-[N,N-bis(trimethylsilyl)aminomethyl]styrene, p-{2-[N,N-bis(trimethylsilyl)amino]ethyl}styrene, m-[N,N-bis(trimethylsilyl)amino]styrene, p-(N-methyl-N-trimethylsilylamino)styrene, p-(N-methyl-N-trimethylsilylaminomethyl)styrene and the like.

The unsaturated monomer represented by the general formulas (5) and (6) may be added to react an active point derived from an organic alkali metal at a ratio of 0.01 to 100-fold mole, preferably 0.01 to 10-fold mole, particularly preferably 1.0 to 3.0-fold mole relative to mole of the active points. And the reaction is preferably performed in a range of 1 second to 2 hours. Further, the unsaturated monomer may be added at an arbitrary time point such as at initiation of polymerization, during polymerization, after completion of polymerization and the like.

A method of hydrogenation and the reaction conditions for the polymer (ii) are not particularly limited and are the same as for the alkoxysilyl group-containing hydrogenated conjugated diene-based polymer. A hydrogenation rate is 80% or more, particularly preferably 95% or more based on a double bond derived from a conjugated diene which is an unsaturated part.

In addition, the compound represented by the general formula (1) for the production of the above-mentioned polymer (iii) includes N-benzylidene methylamine, N-benzylidene ethylamine, N-benzylidene butylamine, N-benzylidene aniline and the like.

An amount of the compound represented by the general formula (1) to be used is usually 0.2 to 3-fold mole, preferably 0.3 to 1.5-fold mole, more preferably 0.4 to 1.3-fold mole relative to mole of the active point.

A method of hydrogenation and the reaction conditions for the polymer (iii) are not particularly limited and are the same as for the alkoxysilyl group-containing hydrogenated conjugated diene-based polymer. A hydrogenation rate is 80% or more, particularly preferably 95% or more based on a double bond derived from a conjugated diene which is an unsaturated part.

Amino group content in the resulting hydrogenated conjugated diene-based polymer obtained as described above is usually 0.0001 to 5 mmol/g, preferably 0.001 to 1 mmol/g, more preferably 0.003 to 0.1 mmol/g. Although an amino group is usually present at an end of a polymer chain, it may be present on a side chain. In addition, the amino group is preferably polymer characterized in hydrogenating a modified polymer having a primary amino group and/or a secondary amino group.

A molecular weight of the amino group-containing hydrogenated conjugated diene-based polymer according to the present invention is not particularly limited, but is generally 30,000 to 2,000,000, preferably 40,000 to 1,000,000, more preferably 50,000 to 500,000 as expressed by a weight-average molecular weight.

The amino group-containing hydrogenated conjugated diene-based polymer according to the present invention may have another functional group such as alkoxysilyl group, epoxy group, glycidyl group, methacryloyl group and acryloyl group.

As described above, the component (b) according to the present invention may be a hydrogenated conjugated diene-based polymer having alkoxysilyl group and amino group. The method thereof is not particularly limited and may be exemplified methods ① to ③ described below.

① Method comprised of polymerizing a conjugated diene or a conjugated diene and an aromatic vinyl compound in the presence of an organic alkali metal compound having amino group, reacting the resulting conjugated diene-based polymer and the compound represented by the general formula (2) to a modified polymer, and hydrogenating the resulting modified polymer.

② Method comprised of polymerizing a conjugated diene and an unsaturated monomer having amino group, or these compounds and an aromatic vinyl compound in the presence of an organic alkali metal compound, reacting the resulting conjugated diene-based polymer and the compound represented by the general formula (2) to a modified polymer, and hydrogenating the resulting modified polymer.

③ Method comprised of polymerizing a conjugated diene or a conjugated diene and an aromatic vinyl compound in the presence of an organic alkali metal compound, reacting the resulting conjugated diene-based polymer and the compound represented by the general formula (7) to a modified polymer, and hydrogenating the resulting modified polymer.

$$R^{12}{}_{(4-m-n)}Si(OR^{13})_m X^2{}_n \quad (7)$$

[In the general formula (7), $R^{12}$ is an alkyl group having a carbon number of 1 to 20, an aryl group having a carbon number of 6 to 20, an aralkyl group having a carbon number of 7 to 20 or an organosiloxyl group having a carbon number of 1 to 100. And, when there are a plurality of $R^{12}$s, respective $R^{12}$ may be the same or different. And $R^{13}$ is an alkyl group having a carbon number of 1 to 20, an aryl group having a carbon number of 6 to 20 or an aralkyl group having a carbon number of 7 to 20, and when there are a plurality of $R^{13}$s, respective $R^{13}$ may be the same or different. $X^2$ is a substituent (provided that $OR^{13}$ is excluded) having a polar group containing at least N atom, and when there are a plurality of $X^2$s, respective $X^2$ may be the same or different, or respective $X^2$ may be an independent substituent or form a cyclic structure. m is 1, 2 or 3, and n is 0, 1, 2 or 3. The sum of m and n is 1 to 4. It is preferable that m is 2 or 3, and n is 0 or 1.]

The alkoxysilane compound represented by the general formula (7) includes N,N-bis(trimethylsilyl)aminopropyltrimethoxysilane, N,N-bis(trimethylsilyl)aminopropyltriethoxysilane, N,N-bis(trimethylsilyl)aminopropyldimethylethoxysilane, N,N-bis(trimethylsilyl)aminopropyldimethylmethoxysilane, N,N-bis(trimethylsilyl)aminopropylmethyldiethoxysilane, N,N-bis(trimethylsilyl)aminopropylmethyldimethoxysilane, N,N-bis(trimethylsilyl)aminoethyltrimethoxysilane, N,N-bis(trimethylsilyl)aminoethyltriethoxysilane, N,N-bis(trimethylsilyl)aminoethyldimethylethoxysilane, N,N-bis(trimethylsilyl)aminoethyldimethylmethoxysilane, N,N-bis(trimethylsilyl)aminoethylmethyldiethoxysilane, N,N-bis(trimethylsilyl)aminoethylmethyldimethoxysilane, N-methyl-N-trimethylsilylaminopropyltrimethoxysilane, N-methyl-N-trimethylsilylaminopropyltriethoxysilane, N-methyl-N-trimethylsilylaminopropyldimethylethoxysilane, N-methyl-N-trimethylsilylaminopropyldimethylmethoxysilane, N-methyl-N-trimethylsilylaminopropylmethyldiethoxysilane, N-methyl-N-trimethylsilylaminopropylmethyldimethoxysilane, N,N-dimethylaminopropyltrimethoxysilane, N,N-dimethylaminopropyltriethoxysilane, N,N-dimethylaminopropyldimethylethoxysilane, N,N-dimethylaminopropyldimethylmethoxysilane, N,N-dimethylaminopropylmethyldiethoxysilane, N,N-dimethylaminopropylmethyldimethoxysilane, N-(1,3-dimethylbutylidene)-3-( triethoxysilyl)-1-propaneamine, N-(1-methylethylidene)-3-( triethoxysilyl)-1-propaneamine, N-(1-methylpropylidene)-3-( triethoxysilyl)-1-propaneamine, N-(4-N,N-dimethylaminobenzylidene)-3-(triethoxysilyl)-1-propaneamine, N-(1,3-dimethylbutylidene-3-(trimethoxysilyl)-1-propaneamine, N-(1-methylethylidene)-3-(trimethoxysilyl)-1-propaneamine, N-ethylidene-3-(trimethoxysilyl)-1-propaneamine, N-(1-methylpropylidene)-3-(trimethoxysilyl)-1-propaneamine, N-(4-N,N- dimethylaminobenzylidene)-3-(trimethoxysilyl)-1-propaneamine, N-(1,3-dimethylbutylidene)-3-(methyldimethoxysilyl)-1-propaneamine, N-(1-methylethylidene)-3-(methyldimethoxysilyl)-1-propaneamine, N-ethylidene-3-(methyldimethoxysilyl)-1-propaneamine, N-(1-methylpropylidene)-3-(methyldimethoxysilyl)-1-propaneamine, N-(4-N,N-dimethylaminobenzylidene)-3-(methyldimethoxysilyl)-1-propaneamine, N-(1,3-dimethylbutylidene)-3-(methyldiethoxysilyl)-1-propaneamine, N-(1-methylethylidene)-3-(methyldiethoxysilyl)-1-propaneamine, N-ethylidene-3-(methyldiethoxysilyl)-1-propaneamine, N-(1-methylpropylidene)-3-(methyldiethoxysilyl)-1-propaneamine, N-(4-N,N-dimethylaminobenzylidene)-3-(methyldiethoxysilyl)-1-propaneamine, N-(1,3-dimethylbutylidene)-3-(dimethylmethoxysilyl)-1-propaneamine, N-(1-methylethylidene)-3-(dimethylmethoxysilyl)-1-propaneamine, N-ethylidene-3-(dimethylmethoxysilyl)-1-propaneamine, N-(1-methylpropylidene)-3-(dimethylmethoxysilyl)-1-propaneamine, N-(4-N,N-dimethylaminobenzylidene)-3-(dimethylmethoxysilyl)-1-propaneamine, N-(1,3-dimethylbutylidene)-3-(dimethylethoxysilyl)-1-propaneamine, N-(1-methylethylidene)-3-(dimethylethoxysilyl)-1-propaneamine, N-ethylidene-3-(dimethylethoxysilyl)-1-propaneamine, N-(1-methylpropylidene)-3-(dimethylethoxysilyl)-1-propaneamine, N-(4-N,N-dimethylaminobenzylidene)-3-(dimethylethoxysilyl)-1-propaneamine and the like.

Alkoxysilyl and amino group contents in the resulting hydrogenated conjugated diene-based polymer having alkoxysilyl group and amino group are generally respectively 0.0001 to 5 mmol/g, preferably 0.001 to 1 mmol/g both, more preferably 0.003 to 0.1 mmol/g both. These functional groups are usually presented at an end of a polymer chain and may be presented on a side chain.

A hydrogenated conjugated diene-based polymer having both alkoxysilyl and amino groups may have another functional group such as epoxy group, glycidyl group, methacryloyl group and acryloyl group.

A method of hydrogenation and the reaction conditions for the hydrogenated conjugated diene-based polymer having alkoxysilyl and amino groups are not particularly limited and are the same as for the alkoxysilyl group-containing hydrogenated conjugated diene-based polymer. A hydrogenation rate is 80% or more, preferably 95% or more of double bonds derived from conjugated diene which is an unsaturated portion.

A molecular weight of the hydrogenated conjugated diene-based polymer having alkoxysilyl and amino groups is not particularly limited, but is generally 30,000 to 2,000,000, preferably 40,000 to 1,000,000, more preferably 50,000 to 500,000 as expressed by a weight-average molecular weight.

A conjugated diene-based polymer to be reacted with an alkoxysilane compound or a compound having amino group or the like may be a polymer obtained by polymerizing only a conjugated diene, or a copolymer obtained by polymerizing a conjugated diene and an aromatic vinyl compound. Considering a molding processability of obtained composition and characteristic of molding, a block copolymer containing 2 or more polymer blocks selected from the following polymer blocks (A) to (D) is preferable:

(A) an aromatic vinyl compound polymer block whose content of an aromatic vinyl compound is 80 wt % or more, (B) a conjugated diene polymer block whose content of a vinyl bond is less than 25 wt %, (C) a conjugated diene polymer block whose content of a vinyl bond is 25 to 90 wt %, and (D) a random copolymer block of an aromatic vinyl compound and a conjugated diene.

Among them, block copolymer having at least one or more of the above-mentioned polymer block (B) and the above-mentioned polymer block (C) is preferable.

A composition ratio of a conjugated diene and an aromatic vinyl compound constituted to the above-mentioned "conjugated diene-based polymer" is not particularly limited, but it may be usually in a range of 5 to 100 wt % of a conjugated diene and 0 to 95 wt % of an aromatic vinyl compound, preferably 5 to 95 wt % of a conjugated diene and 95 to 5 wt % of an aromatic vinyl compound, more preferably 30 to 92 wt % of a conjugated diene and 70 to 8 wt % of an aromatic vinyl compound.

The random copolymer block (D) may contain a taper type in which the content of an aromatic vinyl compound varies continuously in one molecule. Examples of the "block copolymer comprising 2 or more polymer blocks selected from polymer blocks of (A) to (D)" include (A)-(B), (A)-(C), (A)-(D), (C)-(D), (B)-(C), [(A)-(B)]x-Y, [(A)-(C)]x-Y, [(A)-(D)]x-Y, [(C)-(D)]x-Y, [(B)-(C)]x-Y, (A)-(B)-(C), (A)-(B)-(D), (A)-(B)-(A), (A)-(C)-(A), (A)-(D)-(A), (A)-(D)-(C), (A)-(C)-(B), (B)-(C)-(B), [(A)-(B)-(C)]x-Y, [(A)-(B)-(A)]x-Y, [(A)-(C)-(A)]x-Y, [(A)-(D)-(A)]x-Y, [(A)-(D)-(C)]x-Y, (A)-(B)-(A)-(B), (B)-(A)-(B)-(A), (A)-(C)-(A)-(C), (C)-(A)-(C)-(A), [(A)-(B)-(A)-(B)]x-Y, (A)-(B)-(A)-(B)-(A), [(A)-(B)-(A)-(B)-(A)]x-Y, [(B)-(A)]x-Y, [(C)-(A)]x-Y, [(D)-(A)]x-Y, (B)-(A)-(B)-(C), (B)-(A)-(B)-(A), (B)-(A)-(C)-(A), (C)-(A)-(D)-(A), (C)-(A)-(D)-(C), [(C)-(A)-(B)-(C)]x-Y, [(D)-(A)-(B)-(A)]x-Y, [(D)-(A)-(C)-(A)]x-Y, [(D)-(A)-(D)-(A)]x-Y, [(D)-(A)-(D)-(C)]x-Y, (D)-(A)-(B)-(A)-(B), (D)-(B)-(A)-(B)-(A), (D)-(A)-(C)-(A)-(C), (D)-(C)-(A)-(C)-(A), [(D)-(A)-(B)-(A)-(B)]x-Y, (D)-(A)-(B)-(A)-(B)-(A), [(D)-(A)-(B)-(A)-(B)-(A)]x-Y and the like (provided that, x≧2, and Y is a residue of a coupling agent). When formulated into the pellet form, it is preferable that an outer block component of the hydrogenated modified polymer contains at least one (A) and/or (B) polymer block.

Examples of the coupling agent include a halogen compound, an epoxy compound, a carbonyl compound, a polyvinyl compound and the like. Embodiments of the coupling agent include methyldichlorosilane, methyltrichlorosilane, butyltrichlorosilane, tetrachlorosilane, dibromoethane, epoxylated soybean oil, divinylbenzene, tetrachlorotin, butyltrichlorotin, tetrachlorogermanium, bis(trichlorosilyl)ethane, diethyl adipate, dimethyl adipate, dimethyl terephthalate, diethyl terephthalate, polyisocyanate and the like.

The component (b) according to the present invention may be only an alkoxysilyl group-containing hydrogenated conjugated diene-based polymer, and only an amino group-containing hydrogenated conjugated diene-based polymer. The alkoxysilyl group-containing hydrogenated conjugated diene-based polymer may have amino group. (The amino group-containing hydrogenated conjugated diene-based polymer may similarly have alkoxysilyl group.) In addition, the component (b) according to the present invention may be a mixture of an alkoxysilyl group-containing hydrogenated conjugated diene-based polymer and an amino group-containing hydrogenated conjugated diene-based polymer.

Therefore, some combinations of each component constituting the resin composition of the present invention are as follows:

(1) Combination of an ionomer resin and an alkoxysilyl group-containing hydrogenated conjugated diene-based polymer (or an alkoxysilyl group-containing hydrogenated conjugated diene-based polymer having amino group), (2) Combination of an ionomer resin and an amino group-containing hydrogenated conjugated diene-based polymer (or an amino group-containing hydrogenated conjugated diene-based polymer having alkoxysilyl group, (3) Combination of an ionomer resin, an alkoxysilyl group-containing hydrogenated conjugated diene-based polymer (or an alkoxysilyl group-containing hydrogenated conjugated diene-based polymer having amino group) and an amino group-containing hydrogenated conjugated diene-based polymer (or an amino group-containing hydrogenated conjugated diene-based polymer having alkoxysilyl group.

The resin composition of the present invention contains component (a) and component (b). Content ratio (a)/(b) is preferably 30 to 95 wt % /70 to 5 wt %, more preferably 40 to 85 wt % /60 to 15 wt % based on 100 wt % of total of component (a) and component (b). Less than 30 wt % of the content of component (a) leads to inferior tensile strength and, when used in a golf ball cover, the cutting resistance in hitting is deteriorated. On the other hand, exceeding 95 wt % of the content of component (a) shows that softening is not sufficiently performed, and the shot feel and the controllability are not sufficiently improved.

The resin composition of the present invention may further contain a polyolefin resin such as polyethylene, polypropylene, poly(1-butene), propylene.ethylene copolymer, propylene.1-butene copolymer, 1-butene.ethylene copolymer and propylene.ethylene.1-butene copolymer, a polyamide resin such as nylon 4,6, nylon 6 and nylon 6,6, a polyester resin such as polyethylene terephthalate, polybutylene terephthalate and polylactone, a polycarbonate such as poly-2,2-bis(hydroxyphenyl)propane carbonate, an acrylic-based polymer such as polymethyl methacrylate and polyethyl methacrylate, polyoxymethylene, polystyrene, ABS, polyphenylene ether, modified polyphenylene ether, thermoplastic polyester elastomer, thermoplastic polyurethane elastomer, thermoplastic polyamide elastomer, α, β-unsaturated nitrile-acrylic ester-unsaturated diene copolymer rubber, urethane rubber and the like in a range that does not deteriorate the properties of the present resin composition.

In addition, the resin composition of the present invention may contain an inorganic filler, a plasticizer, a glass fiber, a carbon fiber, a thermal anti-aging agent, a light stabilizer, an antistatic agent, a releasing agent, a flame-retardant, a foaming agent, a pigment, a dye, a brightener and the like for the purpose of modifying the property thereof.

The inorganic filler includes talc, calcium carbonate, kaolin, titanium oxide and the like. These may be used alone or in combination of two or more. An amount of the inorganic filler is preferably 0.1 to 40 wt %, more preferably 2 to 30 wt % based on 100 wt % of total of component(a) and component (b). The plasticizer includes a process oil, a low-molecular weight polyethylene, polyethylene glycol and the like.

The resin composition of the present invention is prepared by kneading component (a), component (b) and the like. More particularly, it is obtained by kneading respective constituents in the heat-molten state using a monoaxial extruder, a biaxial extruder, a kneading machine such as a kneader, a Banbury mixer and a roll.

The resulting resin composition may be molded into a molding by an optional molding method such as injection molding, blow molding, press molding, extrusion molding and calendar molding.

Since the resin composition of the present invention gives a molding which has sufficient impact resilience, and at the same time, is excellent in mechanical properties and flexibility, it can be used in various utilities, making advantage of such the characteristics. More specifically, the resin composition of the present invention can be utilized in motorcar parts such as a body panel and a side seal, sport goods such as a golf ball and ski boots, food packaging materials, medical equipment such as a syringe gasket, leisure goods, daily necessaries, toy goods and the like. Among these, a golf ball cover is suitable.

The hardness of a molding in the case the resin composition of the present invention is used as a golf ball cover, is preferably in a range of 40 to 62, more preferably 45 to 60 as expressed by Shore D hardness.

The golf ball of the present invention is the one whose core is covered with a cover material comprising the above-mentioned resin composition.

As a golf ball core to be covered with the cover material, either a golf ball core for a solid golf ball or a golf ball core for a thread-wound golf ball may be used. The golf ball core for a solid golf ball (solid core) may be a core for a two-piece golf ball, or a core for a multiple solid golf ball such as three-piece golf ball. The solid core having the known composition and prepared by the known process can be used.

On the other hand, the core for a thread-wound golf ball (thread-wound core) is the one whose center is wounded with a rubber thread. The center may be a liquid center or a solid center. The thread-wound core having the known composition and prepared by the known process can be used.

A method of covering a golf ball core with a cover material is not particularly limited. A method of injection molding a composition for a cover directly on the golf ball core, a method of pre-forming two hemispherical shell-like half cups of a composition for a cover, wrapping the golf ball core with the cup and molding under pressure and heating at 110 to 160° C. for 2 to 10 minutes and the like can be adopted.

The golf ball of the present invention is controlled at a size and a weight complying with the golf ball regulation and, in this case, a thickness of a cover is preferably in a range of 1 to 3mm.

DESCRIPTION OF THE PREFERRED EMBODIMENTS

The present invention will be explained more specifically by way of Examples below but the present invention is not limited by these Examples.

Part and % in Examples and Comparative examples are expressed by weight unless otherwise indicated. In addition, various measurements are according to the following methods.

① Vinyl Content (1,2-bond and 3,4-bond)

It is analyzed by an infrared analysis (Molero method).

② Bound Styrene Content

It is analyzed by an infrared analysis and calculated by using a calibration curve.

③ Weight-average Molecular Weight

It is obtained by using gel permeation chromatography (GPC) (Product name; "HLC-8120" manufactured by TOSOH Co. Ltd.) and is represented as a standard polystyrene.

④ Alkoxysilyl Group Content (mmol/g)

The content was quantitated from a calibration curve produced by an absorption amount around 1,250 $cm^{-1}$ resulting from Si—$OC_6H_5$ bond present in a modifier (a) by infrared absorption spectrum. In addition, when an alkoxysilyl group present in a modifier is Si—OCH$_3$, Si—OC$_2$H$_5$ or Si—OC(CH$_3$)$_2$(C$_2$H$_5$) bond, the content was quantitated from a calibration curve produced by an absorption amount around 1100 cm$^{-1}$. A mole number of an alkoxysilyl group was obtained by dividing the quantitated value by a number average molecular weight Mn in terms of polystyrene obtained by GPC method and a molecular weight of an alkoxysilyl group.

⑤ Amino Group Content (mmol/g)

It was determined by an amine titration method described in Anal. Chem. 564(1952). That is, the content was obtained by purifying a hydrogenated polymer, dissolving it in an organic solvent, and titrating with HClO$_4$/CH$_3$COOH until the color of the solution turned from purple to blue, using methylviolet as an indicator.

⑥ Hydrogenation Rate of a Conjugated Diene

It was determined from $^1$H-NMR spectrum at 270 MHz using carbon tetrachloride as a solvent.

[1] Synthesis of an Alkoxysilyl and/or an Amino Group-containing Hydrogenated Conjugated Diene Polymer An alkoxysilyl and/or an amino group-containing hydrogenated conjugated diene polymer was synthesized by the methods described below.

SYNTHESIS EXAMPLE 1

5,000 g of cyclohexane, 150 g of styrene, 150 g of tetrahydrofuran and 0.9 g of n-BuLi were added to a reactor having an inner volume of 10 L replaced with nitrogen, first stage polymerization was performed at a polymerization initiation temperature of 50° C. After completion of the reaction, a temperature was maintained at 20° C., and 690 g of 1,3-butadiene was added to perform adiabatically second stage polymerization for 30 minutes. Then, 150 g of styrene was added to perform third stage polymerization. After completion of the reaction, log of 1,3-butadiene was added to perform fourth stage polymerization to obtain a resulting block copolymer. An aliquot of the block polymer had a vinyl bond of 80%, a weight-average molecular weight of about 110,000. And 3.9 g of methyltriphenoxysilane as a modifier was further added to the system, which was reacted for 30 minutes. After the reaction, temperature of the solution was maintained at 70° C. And 0.4 g of bis($\eta^5$-cyclopentadienyl)titanium(tetrahydrofurfuryloxy)chloride and 0.15 g of n-BuLi were added and reacted for 60 minutes while maintaining a hydrogen pressure at 1.0 MPa. After the reaction, the reaction solution was returned to a normal temperature and a normal pressure, and was removed from the reactor. The reaction solution was placed in water while stirring, and the solvent was removed by water steam distillation to obtain an alkoxysilyl group-containing hydrogenated conjugated diene-based polymer (b-1). The obtained polymer (b-1) had a hydrogenation rate of 98%, a weight-average molecular weight of about 120,000 and an alkoxysilyl group content of 0.0161 mmol/g.

By varying a kind of a modifier, an amount of a monomer and the like, alkoxysilyl and/or amino group-containing hydrogenated conjugated diene-based polymer (b-2) to (b-5) shown in Table 1 were obtained according to the polymer (b-1). Polymer (b-6) was prepared without an alkoxysilane compound. Polymer structure A in Table 1 means a "styrene polymer block", and C means a "butadiene polymer block whose content of a vinyl bond is 25 to 90 wt %".

SYNTHESIS EXAMPLE 2

5,000 g of cyclohexane, 300 g of 1,3-butadiene, 0.25 g of tetrahydrofuran and 0.9 g of n-BuLi were added to a reactor having an inner volume of 10 L replaced with nitrogen, first stage polymerization was performed at a polymerization initiation temperature of 70° C. An aliquot of the polymer had a vinyl bond of 10% after completion of the reaction. Then a temperature was maintained at 20° C., and 75 g of tetrahydrofuran was added, further added 700 g of 1,3-butadiene to perform adiabatically second stage polymerization. An aliquot of the block polymer had a vinyl bond of 80% after completion of the second stage reaction, and a weight-average molecular weight of about 140,000 by GPC. And 2.1 g of methyltriphenoxysilane was further added to the system, which was reacted for 30 minutes. After the reaction, temperature of the solution was maintained at 70° C. And 0.4 g of bis($\eta^5$-cyclopentadienyl)titanium (tetrahydrofurfuryloxy)chloride and 0.15 g of n-BuLi were added and reacted for 60 minutes while maintaining a hydrogen pressure at 1.0 MPa. After the reaction, the reaction solution was returned to a normal temperature and a normal pressure, and was removed from the reactor. The reaction solution was placed in water while stirring, and the solvent was removed by water steam distillation to obtain an alkoxysilyl group-containing hydrogenated conjugated diene-based polymer (b-7). The obtained polymer (b-7) had a hydrogenation rate of 95%, a weight-average molecular weight of about 270,000 and an alkoxysilyl group content of 0.003 mmol/g.

By varying a kind of a modifier, an amount of a monomer and the like, alkoxysilyl and amino group-containing hydrogenated conjugated diene-based polymer (b-8) shown in Table 2 were obtained according to the polymer (b-7). Polymer (b-9) was prepared without an alkoxysilane compound.

SYNTHESIS EXAMPLE 3

5,000 g of cyclohexane, 150 g of 1,3-butadiene, 0.25 g of tetrahydrofuran and 0.95 g of n-BuLi were added to a reactor having an inner volume of 10 LN replaced with nitrogen, first stage polymerization was performed at a polymerization initiation temperature of 70° C. An aliquot of the polymer had a vinyl bond of 10% after completion of the reaction. Then a temperature was maintained at 20° C., and 25 g of tetrahydrofuran was added, further added 690 g of 1,3-butadiene to perform adiabatically second stage polymerization for 30 minutes. Then 150 g of styrene was added to perform third stage polymerization. After completion of the reaction, 10 g of 1,3-butadiene was added to perform fourth polymerization. An aliquot of the block polymer had a vinyl bond of 65% after completion of the fourth stage polymerization, and a weight-average molecular weight of about 120,000 by GPC. And 4.03 g of methyltriphenoxysilane was further added to the system, which was reacted for 30 minutes. After the reaction, temperature of the solution was maintained at 70° C. And 0.4 g of bis($\eta^5$-cyclopentadienyl)titanium(tetrahydrofurfuryloxy)chloride and 0.15 g of n-BuLi were added and reacted for 60 minutes while maintaining a hydrogen pressure at 1.0 MPa. After the reaction, the reaction solution was returned to a normal temperature and a normal pressure, and was removed from the reactor. The reaction solution was placed in water while stirring, and the solvent was removed by water steam distillation to obtain an alkoxysilyl group-containing hydrogenated conjugated diene-based polymer (b-1). The obtained polymer (b-10) had a hydrogenation rate of 95%, a weight-average molecular weight of about 130,000 and an alkoxysilyl group content of 0.0148 mmol/g.

By varying a kind of a modifier, an amount of a monomer and the like, alkoxysilyl and amino group-containing hydrogenated conjugated diene-based polymer (b-11) shown in Table 2 were obtained according to the polymer (b-10). Polymer (b-12) was prepared without an alkoxysilane compound. Polymer structure A in Table 2 means a "styrene polymer block", B means a "butadiene polymer block whose content of a vinyl content is less than 25 wt %", and C means a "butadiene polymer block whose content of a vinyl bond is 25 to 90 wt %".

SYNTHESIS EXAMPLE 4

5,000 g of cyclohexane, 150 g of tetrahydrofuran, 400 g of styrene and 2.88 g of 3-lithio-1-N,N-bis(trimethylsilyl) aminopropane as a modifier were added to a reactor having an inner volume of 10 L replaced with nitrogen, and polymerization was performed at initiation temperature of 50° C. After completion of the reaction, a temperature was maintained at 20° C., and 500 g of 1,3-butadiene was added to perform adiabatic polymerization. After 30 minutes, 100 g of styrene was added, and polymerization was continued. Then, the reaction solution was maintained above 80° C., and hydrogen was introduced into the system. Then, 0.32 g of bis($\eta^5$-cyclopentadienyl)titanium (tetrahydrofurfuryloxy) chloride and 0.39 g of tetrachlorosilane were added, which was reacted for 1 hour while maintaining a hydrogen pressure at 1.0 MPa. After the reaction, the reaction solution was returned to a normal temperature and a normal pressure, and was removed from the reactor. The reaction solution was placed in water while stirring, and the solvent was removed by water steam distillation to obtain an amino group-containing hydrogenated conjugated diene-based polymer (b-13). The obtained polymer (b-13) had a hydrogenation rate of 98%, a weight-average molecular weight of about 100,000 and an amino group content of 0.0095 mmol/g.

SYNTHESIS EXAMPLE 5

5,000 g of cyclohexane, 150 g of tetrahydrofuran, 10 g of styrene and 2.89 g of 2,2,5,5-tetramethyl-1-(3-lithiopropyl)-1-aza-2,5-disilacyclopentane as a modifier were added to a reactor having an inner volume of 10 L replaced with nitrogen, polymerization was performed at initiation temperature of 50° C. After completion of the reaction, a temperature was maintained at 20° C., and 850 g of 1,3-butadiene was added to perform adiabatic polymerization. After 30 minutes, 50 g of styrene was added and polymerization was continued. Then, the reaction solution was maintained above 80° C., and hydrogen was introduced in the system. Then, 0.55 g of bis($\eta^5$-cyclopentadienyl) titanium (furfuryloxy)chloride and 0.39 g of tetrachlorosilane were added, which was reacted for 1 hour while maintaining a hydrogen pressure of 1.0 MPa. After the reaction, the reaction solution was returned to a normal temperature and a normal pressure, and was removed from the reactor. The reaction solution was placed into water while stirring, and the solvent was removed by water steam distillation to obtain an amino group-containing hydrogenated conjugated diene-based polymer (b-14). The obtained polymer (b-14) had a hydrogenation rate of 97%, a weight-average molecular weight of about 120,000 and an amino group content of 0.0083 mmol/g.

SYNTHESIS EXAMPLE 6

By varying an amount of a polymerization initiator, a kind of a monomer, an amount of the monomer, a polymerization temperature, a polymerization time and the like so as to obtain a polymer structure of (b-15) in Table 3, a block copolymer was prepared by using n-BuLi according to Synthesis example 1 above. Next, 7.4 g of p-[2-{N,N-bis (trimethylsilyl)amino}ethyl]styrene was added and reacted to active points of the block copolymer for 30 minutes. The reaction solution was maintained above 80° C., and hydrogen was introduced in the system. Then, 2.97 g of a dichlorotris(triphenylphosphine)ruthenium was added, which was reacted for 1 hour while maintaining a hydrogen pressure at 2.0 MPa. After the reaction, the reaction solution was returned to a normal temperature and a normal pressure, and was removed from the reactor. The reaction solution was placed into water while stirring, and the solvent was removed by water steam distillation to obtain an amino group-containing hydrogenated conjugated diene-based polymer (b-15). The obtained polymer (b-15) had a hydrogenation rate of 99%, a weight-average molecular weight of about 120,000 and an amino group content of 0.045 mmol/g.

SYNTHESIS EXAMPLE 7

By varying an amount of a polymerization initiator, a kind of a monomer, an amount of the monomer, a polymerization temperature, a polymerization time and the like so as to obtain a polymer structure of (b-16) in Table 3, a block copolymer was prepared by using n-BuLi according to Synthesis example 1 above. Next, 1.56 g of benzylideneethylamine was added and reacted to active points of the block copolymer for 30 minutes. And the reaction solution was maintained above 80° C., and hydrogen was introduced in the system. Then, 2.60 g of the Pd-BaSO$_4$ was added, which was reacted for 1 hour while maintaining a hydrogen pressure at 2.0 MPa. After the reaction, the reaction solution was returned to a normal temperature and a normal pressure, and was removed from the reactor. The reaction solution was placed into water while stirring, and the solvent was removed by water steam distillation to obtain an amino group-containing hydrogenated conjugated diene-based polymer (b-16). The obtained polymer (b-16) had a hydrogenation rate of 98%, a weight-average molecular weight of about 130,000 and an amino group content of 0.007 mmol/g. Polymer structure A in Table 3 means a "styrene polymer block", and C means a "butadiene polymer block whose content of a vinyl bond is 25 to 90 wt %".

TABLE 1

| Component (b) | (b-1) | (b-2) | (b-3) | (b-4) | (b-5) | (b-6) |
| --- | --- | --- | --- | --- | --- | --- |
| Polymer structure | A-C-A | A-C-A | A-C-A | A-C-A | A-C-A | A-C-A |
| Vinyl bond content in (C) (%) | 80 | 78 | 78 | 78 | 78 | 80 |
| Styrene content (%) | 30.1 | 30.2 | 30.0 | 30.0 | 29.9 | 30.1 |
| Alkoxysilane compound | (i) | (ii) | (iii) | (iv) | (v) | — |
| Alkoxysilyl group content (mmol/100 g) | 1.61 | 0.78 | 0.85 | 0.75 | 1.64 | — |
| Amino group content (mmol/100 g) | — | 0.80 | 0.83 | 0.80 | — | — |

TABLE 1-continued

| Component (b) | (b-1) | (b-2) | (b-3) | (b-4) | (b-5) | (b-6) |
|---|---|---|---|---|---|---|
| Weight-average molecular weight (×10⁴) | 12 | 12 | 12 | 12 | 12 | 12 |
| Hydrogenation rate (%) | 97 | 95 | 96 | 98 | 97 | 98 |

(i): methyltriphenoxysilane
(ii): N,N-bis(trimethylsilyl)aminopropyltriethoxysilane
(iii): N,N-bis(trimethylsilyl)aminopropylmethyldimethoxysilane
(iv): N,N-bis(trimethylsilyl)aminopropylmethyldiethoxysilane
(v): methyldiethoxy(t-amiloxy)silane

TABLE 2

| Component (b) | (b-7) | (b-8) | (b-9) | (b-10) | (b-11) | (b-12) |
|---|---|---|---|---|---|---|
| Polymer structure | B-C-B | B-C-B | B-C-B | B-C-A | B-C-A | B-C-A |
| B content (%) | 30 | 15 | 30 | 15 | 20 | 15 |
| Vinyl bond content in (B) (%) | 10 | 15 | 11 | 10 | 20 | 11 |
| C content (%) | 70 | 85 | 70 | 69 | 59 | 69 |
| Vinyl bond content in (C) (%) | 80 | 40 | 75 | 65 | 80 | 65 |
| Styrene content (%) | — | — | — | 14.9 | 20.0 | 14.9 |
| Alkoxysilane compound | (i) | (ii) | — | (i) | (ii) | — |
| Alkoxysilyl group content (mmol/100 g) | 0.30 | 0.45 | — | 1.48 | 1.30 | — |
| Amino group content (mmol/100 g) | — | 0.45 | — | — | 0.65 | — |
| Weight-average molecular weight (×10⁴) | 27 | 22 | 25 | 13 | 15 | 15 |
| Hydrogenation rate (%) | 95 | 98 | 98 | 95 | 98 | 98 |

(i): methyltriphenoxysilane
(ii): N,N-bis(trimethylsilyl)aminopropyltriethoxysilane

TABLE 3

| Component (b) | (b-13) | (b-14) | (b-15) | (b-16) |
|---|---|---|---|---|
| Polymer structure | A-C-A | A-C-A | A-C-A | A-C-A |
| Vinyl bond content in (C) (%) | 80 | 78 | 79 | 80 |
| Styrene content (%) | 50 | 15 | 15 | 15 |
| Modifier | (vi) | (vii) | (viii) | (ix) |
| Amino group content (mmol/100 g) | 0.95 | 0.83 | 4.50 | 0.70 |
| Weight-average molecular weight (×10⁴) | 10 | 12 | 12 | 13 |
| Hydrogenation rate (%) | 98 | 97 | 99 | 98 |

(vi): 3-lithio-1-N,N-bis(trimethylsilyl)aminopropane
(vii): 2,2,5,5-tetramethyl-1-(3-lithiopropyl)-1-aza-2,5-disilacyclopentane
(vii): p-{2-[N,N-bis(trimethylsilyl)amino]ethyl}styrene
(ix): N-benzylideneethylamine

[2] Example and Comparative Example

Components used in Examples and Comparative examples are as follows:

(a) Ionomer resin; [manufactured by DuPont, 1/1 blend of "Surlyn 9945" (trade name) and "Surlyn 8945" (trade name)]
(b) Alkoxysilyl and/or amino group-containing hydrogenated conjugated diene-based polymer (b-1) to (b-16)

EXAMPLE 1

80 parts of the component (a) and 20 parts of the polymer (b-1) as the component (b) were melted and kneaded using a biaxial extruder (manufactured by Ikegai) set at 200° C. having a cylinder diameter of 45 mm and L/D=32 at 200 rpm to obtain pellets, which were press-molded at a thickness of 2 mm to prepare a test piece for evaluating some physical properties having a thickness of 2 mm at 200° C.

Physical properties of tensile breaking strength, tensile breaking extension and hardness were evaluated according to the method described below. The result is shown in Table 4.

EXAMPLES 2 to 11 and COMPARATIVE EXAMPLES 1 to 3

By using the formulations shown in Tables 4 and 5, a test piece was prepared as in Example 1, and physical properties were evaluated. The results are shown in Tables 4 and 5 below.

EXAMPLES 12 to 15

By using the formulations shown in Table 6, a test piece was prepared as in Example 1, and physical properties were evaluated. The results are shown in Table 6 below.

The physical properties were measured according to the following method.

① Tensile Breaking Strength and Tensile Breaking Extension

It was measured by performing a tensile test using No.3 dumbbell under the temperature condition at 23° C. according to JIS C3005.

② Hardness (Shore D)

It was measured according to JIS K6253 in order to judge the flexibility.

TABLE 4

| | Example | | | | | | |
|---|---|---|---|---|---|---|---|
| | 1 | 2 | 3 | 4 | 5 | 6 | 7 |
| Resin composition | | | | | | | |
| Component (a) (part) | 80 | 80 | 60 | 45 | 80 | 80 | 80 |
| Component (b-1) (part) | 20 | | | | | | |
| Component (b-2) (part) | | 20 | 40 | 55 | | | |
| Component (b-3) (part) | | | | | 20 | | |
| Component (b-4) (part) | | | | | | 20 | |
| Component (b-5) (part) | | | | | | | 20 |
| Property | | | | | | | |
| Tensile breaking strength (MPa) | 32 | 31 | 26 | 20 | 30 | 31 | 32 |
| Tensile breaking extension (%) | 450 | 440 | 500 | 650 | 400 | 430 | 450 |
| Hardness (Shore D) | 60 | 59 | 55 | 48 | 61 | 60 | 60 |

TABLE 5

| | Example | | | | Comparative example | | |
|---|---|---|---|---|---|---|---|
| | 8 | 9 | 10 | 11 | 1 | 2 | 3 |
| Resin composition | | | | | | | |
| Component (a) (part) | 80 | 80 | 80 | 80 | 80 | 80 | 80 |
| Component (b-7) (part) | 20 | | | | | | |
| Component (b-8) (part) | | 20 | | | | | |
| Component (b-10) (part) | | | 20 | | | | |
| Component (b-11) (part) | | | | 20 | | | |
| Component (b-6) (part) | | | | | 20 | | |
| Component (b-9) (part) | | | | | | 20 | |
| Component (b-12) (part) | | | | | | | 20 |
| Property | | | | | | | |
| Tensile breaking strength (MPa) | 30 | 31 | 32 | 33 | 15 | 18 | 14 |
| Tensile breaking extension (%) | 410 | 460 | 420 | 470 | 250 | 150 | 100 |
| Hardness (Shore D) | 60 | 61 | 61 | 62 | 63 | 64 | 63 |

TABLE 6

| | Example | | | |
|---|---|---|---|---|
| | 12 | 13 | 14 | 15 |
| Resin composition | | | | |
| Component (a) (part) | 80 | 80 | 80 | 80 |
| Component (b-13) (part) | 20 | | | |
| Component (b-14) (part) | | 20 | | |
| Component (b-15) (part) | | | 20 | |
| Component (b-16) (part) | | | | 20 |
| Property | | | | |
| Tensile breaking strength (MPa) | 29 | 30 | 29 | 28 |

TABLE 6-continued

| | Example | | | |
|---|---|---|---|---|
| | 12 | 13 | 14 | 15 |
| Tensile breaking extension (%) | 400 | 380 | 390 | 400 |
| Hardness (Shore D) | 61 | 61 | 62 | 61 |

Based on the results shown in Table 5, hydrogenated polymers having no alkoxysilyl and amino groups in Comparative examples 1 to 3 showed that hardness of those were sufficient but tensile breaking strength and tensile breaking extension were not enough and inferior in flexibility. On the other hand, Examples 1 to 15 shown in Tables 4 to 6 were excellent in balance of tensile breaking strength, tensile breaking extension and flexibility.

EXAMPLES 16 to 30 and COMPARATIVE EXAMPLES 4 to 6

100 parts of polybutadiene (Trade name; "BR01", manufactured by JSR Corp.), 25 parts of zinc diacrylate, 22 parts of zinc oxide, 1.8 parts of dicumylperoxide and 0.5 part of an antioxidant were kneaded using a roll and the resulting composition for a golf ball core was crosslinking-molded under pressure at 150° C. for 30 minutes to obtain a golf ball core having a diameter of 38.5 mm.

Then, the resulting golf ball core was covered with a cover formed by an injection molding method using a composition for a cover comprising a mixture of 100 parts of a polymer composition and 2 parts of titanium dioxide shown in Tables 7 to 9, to a two-piece solid golf ball having an external diameter of 42.7 mm.

Weight, hardness, ball initial velocity, carry and cutting resistance of the resulting two-piece solid golf balls were measured. The results are shown in Tables 7 to 9. In addition, the resulting golf balls were actually hit with a wood club No.1, whereby the shot feel was examined. The results thereof are also shown in Tables 7 to 9.

Methods for measuring hardness, ball initial velocity and carry as well as methods for evaluating shot feel and cutting resistance are as follows.

(1) Hardness; An amount of deflection (mm) when a load of 100 kg was applied to a golf ball was measured. The greater value indicates that the ball is soft.
(2) Ball initial velocity; A wood club No.1 was attached to a swing robot manufactured by True Temper, a ball was hit at a head speed of 45 m/sec., and the ball initial velocity (m/sec.) thereupon was measured.
(3) Carry; A wood club No.1 was attached to a swing robot manufactured by True Temper, a ball was hit at a head speed of 45 m/sec., and a distance (yard) to a drop point was measured.
(4) Shot feel; The shot feel was evaluated with an actual hitting test. Upon evaluation of the shot feel, it was evaluated using a ball of Comparative example 4 as a control. The evaluation criteria are described below. The results of evaluation are expressed in each Table using the same symbols.

Evaluation criteria is as follows:
○; the shot feel is softer and better than the ball of Comparative example 4,
Δ; the shot feel is equal to that of the ball of Comparative example 4,
X; the shot feel is harder and worse than that of the ball of Comparative example 4.

(5) Cutting resistance; A temperature of a ball was maintained at 23° C., a pitching wedge was attached to a swing robot machine, a ball was topped at a head speed of 32 m/sec., and the presence or the absence of a cut scratch was examined.
○; No scratch,
X; Scratch.

TABLE 7

|  | Example | | | | | | |
|---|---|---|---|---|---|---|---|
|  | 12 | 13 | 14 | 15 | 16 | 17 | 18 |
| Resin composition for golf ball cover | | | | | | | |
| Component (a) (part) | 80 | 80 | 60 | 45 | 80 | 80 | 80 |
| Component (b-1) (part) | 20 | | | | | | |
| Component (b-2) (part) | | 20 | 40 | 55 | | | |
| Component (b-3) (part) | | | | | 20 | | |
| Component (b-4) (part) | | | | | | 20 | |
| Component (b-5) (part) | | | | | | | 20 |
| Titanium dioxide (part) | 2 | 2 | 2 | 2 | 2 | 2 | 2 |
| Characteristic of golf ball | | | | | | | |
| Weight (g) | 45.2 | 45.2 | 45.2 | 45.3 | 45.2 | 45.2 | 45.2 |
| Hardness (mm) | 2.63 | 2.64 | 2.75 | 2.67 | 2.64 | 2.58 | 2.59 |
| Initial velocity (m/sec.) | 66.5 | 66.3 | 65.7 | 65.3 | 66.6 | 66.4 | 66.4 |
| Carry (yard) | 235 | 234 | 231 | 230 | 235 | 234 | 234 |
| Hitting feeling | ⊚ | ○ | ○ | ⊚ | ⊚ | ⊚ | ⊚ |
| Anti-cutting | ○ | ○ | ○ | ○ | ○ | ○ | ○ |

TABLE 8

|  | Example | | | | Comparative example | | |
|---|---|---|---|---|---|---|---|
|  | 19 | 20 | 21 | 22 | 4 | 5 | 6 |
| Resin composition for golf ball cover | | | | | | | |
| Component (a) (part) | 80 | 80 | 80 | 80 | 80 | 80 | 80 |
| Component (b-7) (part) | 20 | | | | | | |
| Component (b-8) (part) | | 20 | | | | | |
| Component (b-10) (part) | | | 20 | | | | |
| Component (b-11) (part) | | | | 20 | | | |
| Component (b-6) (part) | | | | | 20 | | |
| Component (b-9) (part) | | | | | | 20 | |
| Component (b-12) (part) | | | | | | | 20 |
| Titanium dioxide (part) | 2 | 2 | 2 | 2 | 2 | 2 | 2 |
| Characterisitic of golf ball | | | | | | | |
| Weight (g) | 45.2 | 45.2 | 45.4 | 45.3 | 45.3 | 45.3 | 45.4 |
| Hardness (mm) | 2.64 | 2.59 | 2.61 | 2.67 | 2.59 | 2.64 | 2.62 |
| Initial velocity (m/sec.) | 66.2 | 66.5 | 66.5 | 66.3 | 64.5 | 64.3 | 64.6 |
| Carry (yard) | 233 | 236 | 235 | 234 | 225 | 224 | 226 |
| Hitting feeling | ⊚ | ⊚ | ⊚ | ⊚ | ○ | ○ | ○ |
| Anti-cutting | ○ | ○ | ○ | ○ | x | x | x |

TABLE 9

|  | Example | | | |
|---|---|---|---|---|
|  | 27 | 28 | 29 | 30 |
| Resin composition for golf ball cover | | | | |
| Component (a) (part) | 80 | 80 | 80 | 80 |
| Component (b-13) (part) | 20 | | | |
| Component (b-14) (part) | | 20 | | |
| Component (b-15) (part) | | | 20 | |
| Component (b-16) (part) | | | | 20 |
| Titanium dioxide (part) | 2 | 2 | 2 | 2 |
| Characteristic of golf ball | | | | |
| Weight (g) | 45.2 | 45.3 | 45.2 | 45.4 |
| Hardness (mm) | 2.60 | 2.64 | 2.62 | 2.61 |
| Initial velocity (m/sec.) | 66.2 | 66.3 | 66.1 | 66.2 |
| Carry (yard) | 234 | 234 | 232 | 232 |
| Hitting feeling | ⊚ | ⊚ | ⊚ | ⊚ |
| Anti-cutting | ○ | ○ | ○ | ○ |

Based on the results shown in Table 8, golf balls in Comparative examples 4 to 6 didn't reach to 230 yards because moldings were inferior in impact resilience and ball initial velocities were in the range of between 64 and 65 m/sec. On the other hand, based on the results shown in Tables 7 to 9, all of the ball initial velocities in Examples 16 to 30 were beyond 64 m/sec. and carries were 230 yard over. In addition, all the shot feels were excellent and the cutting resistances were also good.

What is claimed is:

1. A resin composition comprising (a) an ionomer resin, (b) an alkoxysilyl group-containing hydrogenated conjugated diene-based polymer and (c) an amino group-containing hydrogenated conjugated diene-based polymer.

2. The resin composition according to claim 1, wherein alkoxysilyl group content in said alkoxysilyl group-containing hydrogenated conjugated diene-based polymer is 0.0001 to 5 mmol/g and amino group content in said amino group-containing hydrogenated conjugated diene-based polymer is 0.0001 to 5 mmol/g.

3. The resin composition according to claim 1, wherein said alkoxysilyl group-containing hydrogenated conjugated diene-based polymer and said amino group-containing hydrogenated conjugated diene-based polymer are polymers which are saturated at 80% or more of double bonds derived from conjugated diene.

4. The resin composition according to claim 1, further containing at least one inorganic filler selected from the group consisting of titanium oxide, talc, calcium carbonate and kaolin.

5. The resin composition according to claim 1, wherein said alkoxysilyl group-containing hydrogenated conjugated diene-based polymer is a polymer prepared by polymerizing a conjugated diene or a conjugated diene and an aromatic vinyl compound in the presence of an organic alkali metal compound, reacting the resulting conjugated diene-based polymer with an alkoxysilane compound and, thereafter, hydrogenating the modified polymer.

6. The resin composition according to claim 5, wherein said conjugated diene-based polymer is a block copolymer containing 2 or more polymer blocks selected from the group consisting of polymer blocks (A) to (D)

(A) an aromatic vinyl compound polymer block whose content of an aromatic vinyl compound is 80 wt % or more, (B) a conjugated diene polymer block whose content of a vinyl bond is less than 25 wt %,
(C) a conjugated diene polymer block whose content of a vinyl bond is 25 to 90 wt %, and
(D) a random copolymer block of an aromatic vinyl compound and a conjugated diene.

7. The resin composition according to claim 6, wherein said alkoxysilyl group-containing hydrogenated conjugated diene-based polymer and said amino group-containing hydrogenated conjugated diene-based polymer are polymers which are saturated at 80% or more of double bonds derived from conjugated diene.

8. The resin composition according to claim 7, further containing at least one inorganic filler selected from the group consisting of titanium oxide, talc, calcium carbonate and kaolin.

9. The resin composition according to claim 1, wherein said amino group-containing hydrogenated conjugated diene-based polymer is at least one polymer selected from the group consisting of (i) to (iii),
(i) a polymer prepared by polymerizing a conjugated diene or a conjugated diene and an aromatic vinyl compound in the presence of an organic alkali metal compound having amino group, and hydrogenating the resulting conjugated diene-based polymer,
(ii) a polymer prepared by polymerizing a conjugated diene and a unsaturated monomer having amino group, or these compounds and an aromatic vinyl compound in the presence of an organic alkali metal compound, and hydrogenating the resulting conjugated diene-based polymer, and
(iii) a polymer prepared by polymerizing a conjugated diene or a conjugated diene and an aromatic vinyl compound in the presence of an organic alkali metal compound, reacting the resulting conjugated diene-based polymer and a compound represented by formula (1) to a modified polymer, and hydrogenating the resulting modified polymer, $$R^1R^2C=N-Y \qquad (1)$$

where in formula (1), $R^1$ and $R^2$ are respectively a hydrogen atom, an alkyl group having a carbon number of 1 to 20, an aryl group having a carbon number of 6 to 20, an aralkyl group having a carbon number of 7 to 20 or an organosiloxyl group having a carbon number of 1 to 100, and Y is a hydrogen atom, a trialkysilyl group having a carbon number of 3 to 18, an alkyl group having a carbon number of 1 to 20, an aryl group having a carbon number of 6 to 20, an aralkyl group having a carbon number or 7 to 20 or an organosiloxyl group having a carbon number of 1 to 100.

10. The resin composition according to claim 9, wherein said conjugated diene-based polymer is a block copolymer containing 2 or more polymer blocks selected from the group consisting of polymer blocks (A) to (D),
(A) an aromatic vinyl compound polymer block whose content of an aromatic vinyl compound is 80 wt % or more,
(B) a conjugated diene polymer block whose content of a vinyl bond is less than 25 wt %,
(C) a conjugated diene polymer block whose content of a vinyl bond is 25 to 90 wt %, and
(D) a random copolymer block of an aromatic vinyl compound and a conjugated diene.

11. The resin composition according to claim 10, wherein said alkoxysilyl group-containing hydrogenated conjugated diene-based polymer and said amino group-containing hydrogenated conjugated diene-based polymer are polymers which are saturated at 80% or more of double bonds derived from conjugated diene.

12. The resin composition according to claim 11, further containing at least one inorganic filler selected from the group consisting of titanium oxide, talc, calcium carbonate and kaolin.

13. A golf ball whose core is covered with a cover material comprising a resin composition comprising (a) an ionomer resin, (b) an alkoxysilyl group-containing hydrogenated conjugated diene-based polymer, and (c) an amino group-containing hydrogenated conjugated diene-based polymer.

14. The golf ball according to claim 13, wherein the alkoxysilyl group content in said alkoxysilyl group-containing hydrogenated conjugated diene-based polymer is 0.0001 to 5 mmol/g and amino group content in said amino group-containing hydrogenated conjugated diene-based polymer is 0.0001 to 5 mmol/g.

15. The golf ball according to claim 13, wherein said alkoxysilyl group-containing hydrogenated conjugated diene-based polymer is a polymer prepared by polymerizing a conjugated diene or a conjugated diene and an aromatic vinyl compound in the presence of an organic alkali metal compound, reacting the resulting conjugated diene-based polymer with an alkoxysilane compound and, thereafter, hydrogenating the modified polymer.

16. The golf ball according to claim 15, further containing at least one inorganic filler selected from the group consisting of titanium oxide, talc, calcium carbonate and kaolin in said resin composition.

17. The golf ball according to claim 13, wherein said amino group-containing hydrogenated conjugated diene-based polymer is at least one polymer selected from the group consisting of (i) to (iii),
(i) a polymer prepared by polymerizing a conjugated diene or a conjugated diene and an aromatic vinyl compound in the presence of an organic alkali metal compound having amino group, and hydrogenating the resulting conjugated diene-based polymer
(ii) a polymer prepared by polymerizing a conjugated diene and a unsaturated monomer having amino group, or these compounds and an aromatic vinyl compound in the presence of an organic alkali metal compound, and hydrogenating the resulting conjugated diene-based polymer, and
(iii) a polymer prepared by polymerizing a conjugated diene or a conjugated diene and an aromatic vinyl compound in the presence of an organic alkali metal compound, reacting the resulting conjugated diene-based polymer and a compound represented by formula (1) to a modified polymer, and hydrogenating the resulting modified polymer, $$R^1R^2C=N-Y \qquad (1)$$

where in formula (1), $R^1$ and $R^2$ are respectively a hydrogen atom, an alkyl group having a carbon number of 1 to 20, an aryl group having a carbon number of 6 to 20, an aralkyl group having a carbon number of 7 to 20 or an organosiloxyl group having a carbon number of 1 to 100, and Y is a hydrogen atom, a trialkysilyl group having a carbon number of 3 to 18, an alkyl group having a carbon number of 1 to 20, an aryl group having a carbon number of 6 to 20, an aralkyl group having a carbon number or 7 to 20 or an organosiloxyl group having a carbon number of 1 to 100.

18. The golf ball according to claim 13, further containing at least one inorganic filler selected from the group consisting of titanium oxide, talc, calcium carbonate and kaolin in said resin composition.

19. A resin composition comprising (a) an ionomer resin and (b) a hydrogenated conjugated diene-based polymer having both alkoxysilyl groups and amino groups.

20. The resin composition according to claim 19, wherein said hydrogenated conjugated diene-based polymer is a polymer prepared by polymerizing a conjugated diene or a conjugated diene and an aromatic vinyl compound in the presence of an organic alkali metal compound, reacting the resulting conjugated diene-based polymer with an alkoxysilane compound represented by formula (7) to a modified polymer and, thereafter, hydrogenating the modified polymer, $$R^{12}{}_{(4-m-n)}Si(OR^{13})_m X^2{}_n \qquad (7),$$

wherein formula (7), $R^{12}$ is an alkyl group having a carbon number of 1 to 20, an aryl group having a carbon number of 6 to 20, an aralkyl group having a carbon number of 7 to 20 or an organosiloxyl group having a carbon number of 1 to 100, and, when there are a plurality of $R^{12}$s, respective $R^{12}$ may be the same or different, and $R^{13}$ is an alkyl group having a carbon number of 1 to 20, an aryl group having a carbon number of 6 to 20 or an aralkyl group having a carbon number of 7 to 20, and when there are a plurality of $R^{13}$s, respective $R^{13}$ may be the same or different, $X^2$ is a substituent (provided that $OR^{13}$ is excluded) having a polar group containing at least an N atom, and when there are a plurality of $X^2$s, respective, $X^2$ may be the same or different, or respective $X^2$ may be an independent substituent or form a cyclic structure, m is 1, 2 or 3, and n is 1, 2 or 3, and the sum of m and n is 2 to 4.

21. The resin composition according to claim 19, further comprising an amino group-containing hydrogenated conjugated diene-based polymer.

22. The resin composition according to claim 21, wherein said hydrogenated conjugated diene-based polymer is a polymer prepared by polymerizing a conjugated diene or a conjugated diene and an aromatic vinyl, compound in the presence of an organic alkali metal compound, reacting the resulting conjugated diene-based polymer with an alkoxysilane compound represented by formula (7) to a modified polymer and, thereafter, hydrogenating the modified polymer, $$R^{12}{}_{(4-m-n)}Si(OR^{13})_m X^2{}_n \qquad (7),$$

wherein formula (7), $R^{12}$ is an alkyl group having a carbon number of 1 to 20, an aryl group having a carbon number of 6 to 20, an aralkyl group having a carbon number of 7 to 20 or an organosiloxyl group having a carbon number of 1 to 100, and, when there are a plurality of $R^{12}$s, respective $R^{12}$ maybe the same or different, and $R^{13}$ is an alkyl group having a carbon number of 1 to 20, an aryl group having a carbon number of 6 to 20 or an aralkyl group having a carbon number of 7 to 20, and when there are a plurality of $R^{13}$s, respective $R^2$ may be the same or different, $X^2$ is a substituent (provided that $OR^{13}$ is excluded) having a polar group containing at least an N atom, and when there are a plurality of $X^2$s, respective, $X^2$ be the same or different, or respective $X^2$ may be an independent substituent or form a cyclic structure, m is 1, 2 or 3, and n is 1, 2 or 3, and the sum of m and n is 2 to 4.

23. The resin composition according to claim 19, wherein the alkoxysilyl group content and the amino group content are 0.0001 to 5 mmol/g each in said hydrogenated conjugated diene-based polymer having both alkoxysilyl groups and amino groups.

24. The resin composition according to claim 19, wherein said hydrogenated conjugated diene-based polymer having both alkoxysilyl group and amino group is a polymer which is saturated at 80% or more of double bonds derived from conjugated diene.

25. The resin composition according to claim 19, further comprising at least one inorganic filler selected from the group consisting of titanium oxide, talc, calcium carbonate and kaolin.

26. A golf ball whose core is covered with a cover material comprising a resin composition comprising an ionomer resin and a hydrogenated conjugated diene-based polymer having both alkoxysilyl groups and amino groups.

27. The golf ball according to claim 26, wherein the alkoxysilyl group content and the amino group content are 0.0001 to 5 mmol/g each in said hydrogenated conjugated diene-based polymer having both alkoxysilyl group and amino group.

28. The golf ball according to claim 26, further comprising at least one inorganic filler selected from the group consisting of titanium oxide, talc, calcium carbonate and kaolin in said resin composition.

* * * * *